(12) United States Patent
Indyk et al.

(10) Patent No.: US 11,163,778 B2
(45) Date of Patent: Nov. 2, 2021

(54) INTEGRATING VIRTUAL AND HUMAN AGENTS IN A MULTI-CHANNEL SUPPORT SYSTEM FOR COMPLEX SOFTWARE APPLICATIONS

(71) Applicant: INTUIT INC., Mountain View, CA (US)

(72) Inventors: Benjamin Indyk, San Diego, CA (US); Igor A. Podgorny, Mountain View, CA (US); Matthew Cannon, San Diego, CA (US); Chris Gielow, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 1107 days.

(21) Appl. No.: 15/603,112

(22) Filed: May 23, 2017

(65) Prior Publication Data

US 2018/0341685 A1    Nov. 29, 2018

(51) Int. Cl.
| | | |
|---|---|---|
| *G06F 16/00* | (2019.01) | |
| *G06F 16/2457* | (2019.01) | |
| *G06F 16/28* | (2019.01) | |
| *G06F 16/9535* | (2019.01) | |
| *G06F 16/9032* | (2019.01) | |
| *G06F 40/30* | (2020.01) | |
| *G06N 5/02* | (2006.01) | |

(52) U.S. Cl.
CPC ........ *G06F 16/24575* (2019.01); *G06F 16/00* (2019.01); *G06F 16/285* (2019.01); *G06F 16/90332* (2019.01); *G06F 16/9535* (2019.01); *G06F 40/30* (2020.01); *G06N 5/02* (2013.01)

(58) Field of Classification Search
CPC ............. G06F 16/9535; G06F 16/2365; G06F 16/9577; G06F 16/907
See application file for complete search history.

(56) References Cited

U.S. PATENT DOCUMENTS

| | | | |
|---|---|---|---|
| 8,452,668 B1 * | 5/2013 | Peterson ................ | G06Q 10/10 705/26.7 |
| 8,468,110 B1 * | 6/2013 | Podgorny ........... | G06F 11/3438 706/45 |
| 2011/0141919 A1 * | 6/2011 | Singh .................. | H04L 41/0681 370/252 |

(Continued)

OTHER PUBLICATIONS

Ranathunga, Ranathunga Arachchige Dayani Surangika, and Surangika Ranathunga. Improving awareness of intelligent virtual agents. Diss. University of Otago, 2013.*

(Continued)

*Primary Examiner* — Nan Hutton
(74) *Attorney, Agent, or Firm* — Patterson + Sheridan, LLP

(57) ABSTRACT

The present disclosure relates to processing support requests, or support queries, in a software application including automated and human interaction-based support systems. An example method generally includes receiving a support request from a client device. A query processor parses the support request to identify one or more characteristics of the support request and identifies a support system to process the support request based at least in part on the identified one or more characteristics of the support request. The query processor instantiates a support session with the identified support system to process the support request.

20 Claims, 5 Drawing Sheets

(56) References Cited

U.S. PATENT DOCUMENTS

| | | | |
|---|---|---|---|
| 2013/0346886 A1* | 12/2013 | Cauchois | H04L 51/046 |
| | | | 715/758 |
| 2014/0310607 A1* | 10/2014 | Abraham | G06F 16/2457 |
| | | | 715/738 |
| 2015/0103995 A1 | 4/2015 | McCormack et al. | |
| 2017/0006032 A1* | 1/2017 | Simpson | H04W 4/21 |
| 2017/0104876 A1* | 4/2017 | Hibbard | H04M 3/5141 |
| 2017/0262431 A1* | 9/2017 | Alam | G06Q 10/00 |

OTHER PUBLICATIONS

Charfi, Ahmed Anis, and Muhammad Atif. "Virtual agent: A determinant of online social presence and consumer trust in websites." International Journal of Economic Practices and Theories 4.5 (2014): 796-806.*

Anonymous: "DigitalGenius—Human+AI for Customer," https://vimeo.com/185500903, retrieved Oct. 4, 2016, 2 pages.

PCT International Search Report, PCT/US2017/034536, dated Sep. 11, 2017, 21 pages.

* cited by examiner

INTEGRATING VIRTUAL AND HUMAN AGENTS IN A MULTI-CHANNEL SUPPORT SYSTEM FOR COMPLEX SOFTWARE APPLICATIONS

BACKGROUND

Field

Embodiments of the present disclosure generally relate to support systems for software applications, and more specifically to integrating and dynamically selecting support systems used to process support requests (queries) received from a user of the software applications (e.g., text search queries, voice input, textual input, and other input requesting information about a software application).

Description of the Related Art

Software applications generally include a variety of support systems that allow a user to obtain assistance in using features of the software applications. These support systems include, for example, searchable knowledge bases, community knowledge-based support systems (e.g., discussion forums), virtual chat systems, and live, interactive support systems (e.g., live chat, video conference systems, and the like). Typically, searchable knowledge bases and community knowledge-based support systems include a large amount of information that a user searches through to find an answer to a question about software functionality. However, because of the breadth of information included in these large knowledge bases, it may be difficult and time-consuming for users to find an answer to a question about software functionality.

Community knowledge-based support systems allow users of software applications to ask questions about software functionality to a community of users (e.g., crowdsourcing an answer to a question about software functionality. In these support systems, users can provide answers to other users' questions. The asking user can subsequently mark answers from other users as a solution to the question, and the answer marked as the solution may be displayed in a manner indicative of the designation as the answer (e.g., underneath the forum post in which the question was asked, highlighted using a different color, associated with an icon, and so on). As with searchable knowledge bases, community knowledge-based support systems include a large amount of information, and the breadth of information included in these systems also makes it difficult and time-consuming for users to find an answer to questions about software functionality.

Live, interactive support systems, on the other hand, allow a user to interact with another person or a simulation of another person (e.g., in situations where virtual chat systems, or "chatbots," are deployed) in order to obtain support for a software application. Virtual chat systems generally leverage an artificial intelligence engine and/or sets of rules relative to a question being processed in order to provide a user with a conversation similar to that of an actual human support agent. In some cases, a user can initiate a support session with a human agent (e.g., via a textual chat system, a video conferencing system, and the like) to obtain real-time support for the software system.

SUMMARY

One embodiment of the present disclosure includes a method for selecting a support system to process support requests in a software application based, at least in part, on the contents of the support request. The method generally includes receiving a support request from a client device. A query processor parses the support request to identify one or more characteristics of the support request and identifies a support system to process the support request based at least in part on the identified one or more characteristics of the support request. The query processor instantiates a support session with the identified support system to process the support request.

Another embodiment provides a computer-readable storage medium having instructions, which, when executed on a processor, performs an operation for selecting a support system to process support requests in a software application based on the contents of the support request. The operation generally includes receiving a support request from a client device. A query processor parses the support request to identify one or more characteristics of the support request and identifies a support system to process the support request based at least in part on the identified one or more characteristics of the support request. The query processor instantiates a support session with the identified support system to process the support request.

Still another embodiment of the present invention includes a processor and a memory storing a program, which, when executed on the processor, performs an operation for selecting a support system to process support requests in a software application based on the contents of the support request. The operation generally includes receiving a support request from a client device. A query processor parses the support request to identify one or more characteristics of the support request and identifies a support system to process the support request based at least in part on the identified one or more characteristics of the support request. The query processor instantiates a support session with the identified support system to process the support request.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Various support systems may be deployed, alone or in combination, in order to provide support for users of a software application. As discussed above, these support systems may include exposing a searchable knowledge base to a user (which, in some cases, may additionally include guided search or suggested search features that can predict and recommend subsequent queries), providing a forum to a user in which a user can obtain support from other users, and allowing a user to interact with virtual and/or live agents. Generally, directing users to searchable knowledge bases or community-generated support systems and using virtual agents to provide support to users is more cost-effective than directing users to a live support session with a human agent. However, for certain types of questions or in certain scenarios, such as when a user has been attempting to complete a step in a workflow implemented by the software application for an extended period of time, when a user is attempting to retrieve or reset user credentials, or when a user is prompted to pay for the software application, it may be more effective to invoke a live support session with a human agent to provide support to the user.

Aspects of the present disclosure generally use the content of the support request and, in some cases, contextual information associated with a support request to route a support request to one or more support systems for processing (e.g., to generate an answer to questions about the functionality of a software application). As used herein, the terms "support request" and "query" may be used interchangeably. The contextual information associated with the support request may include, for example, information about the amount of time a user has spent in a particular portion of the software application, a number of support requests the user has generated while spending time in that portion of the software application, whether the user has paid for the software application, and the like. By analyzing at least the content of a support request and the context associated with the support request, a support system dispatcher can provide guidance to a user that is expected to lead to a solution with minimal real-time human interaction. The support system dispatcher may, in some cases, further use information entered into or generated by a workflow (e.g., user-provided information, information imported from paper documents, and the like, such as tax form data imported into a tax preparation workflow) to provide guidance to a user. Further, real-time human interaction may be reserved for types of support requests for which real-time human interaction is expected to answer a user's queries more efficiently, which may allow human agents to be available to help more users over a period of time.

Figure 1:
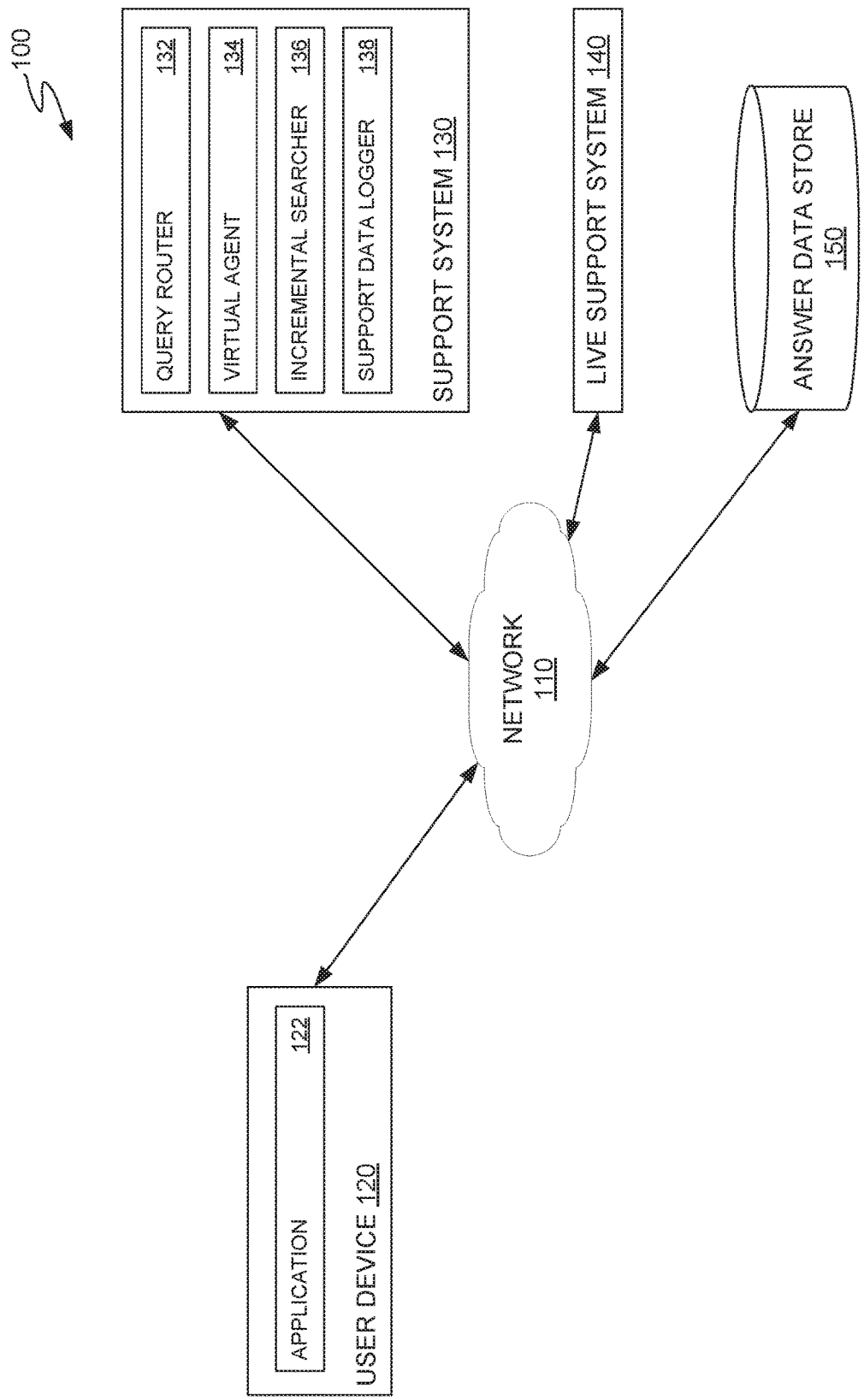
FIG. 1 illustrates an example networked computing environment, according to one embodiment.

FIG. 1 illustrates an example networked system 100, according to an embodiment. As illustrated, system 100 generally includes a user device 120, a support system 130, a live support system 140, and an answer data store 150.

User device 120 generally hosts an application 122 that implements a workflow or allows a user to access a workflow hosted on a remote system. Application 122 includes one or more user interface elements that allow a user to interact with the workflow (e.g., provide data to the workflow, remove or revise data used by the workflow to calculate a final result, and the like). Application 122 also includes one or more user interface elements that allow a user to invoke a support session. In some cases, these user interface elements may include, for example, a button to launch a support session, a text entry box allowing a user to enter a question or search query, a vocal input processor to capture spoken questions, and the like. When a user provides input to application 122 to invoke a support session, application 122 can record the user input as a query and transmit the query to support system 130 for processing. In some cases, application 122 may provide additional information along with the query to allow support system 130 to determine a support system to use for responding to the query. The additional information may be contextual information associated with the query, which may include information identifying the user (or identifying the user as a guest if the user has not logged into a user account), an amount of time the user has spent on a particular portion of the workflow implemented by application 122, and the like.

Support system 130 generally receives a query from a user, processes the query to identify the support system to use to provide an answer to the query, and routes the query to the identified support system for processing. As illustrated, support system 130 generally includes a query router 132, virtual agent 134, incremental searcher 136, and support data logger 138.

Query router 132 generally processes the support query received from user device 120 based on the content of the query, context information associated with the query, predictive analytics generated from analyses of responses to previous queries, and the like. The query, as discussed above, may be received by query router 132 as a text string or as audio data. If query router 132 receives a query as audio data, query router 132 may perform speech-to-text conversion to generate a text string which can be processed by query router 132 to route the query to a support system, as discussed herein. In some cases, query router 132 may additionally receive contextual information associated with the query to use in routing the query to one or more support systems for processing. In some cases, to process the query, query router 132 may perform a linguistic analysis of the received query to identify the type of question posed by the query, which may include, for example, textual analysis of the query and/or paralinguistic analysis of the query. A paralinguistic analysis of the received query generally allows for a system to extract information identifying the gender, speaking traits, and/or emotional state of the user, which may be used to determine the characteristics of the question posed by the query. For example, query router 132 may analyze the query to identify whether the question is an open-ended question (i.e., questions that may not concretely identify what a user is searching for or questions for which a response is required) or a closed-ended question (i.e., questions that clearly identify what a user is searching for and can be answered with a specific piece of information). Information about whether the question is an open-ended question or a closed-ended question may, in part, determine whether the query is routed to an iterative search system, a virtual agent system, or a live support system with human interaction for processing.

In some cases, query router 132 can analyze a question to determine if the received query is a "five Ws" question (who, what, when, where, or why), which may influence the identification of a query as an open-ended question or a closed-ended question. For example, in a tax preparation workflow, if query router 132 receives a query of "Where do I input income information?" query router 132 can determine that the received query is a closed-ended question because the query requests specific information about a specific portion of the workflow. In contrast, if query router 132 receives a query of "Why do I have to pay for the software application?" query router 132 can determine that the received query is an open-ended question, as there may be many reasons why the user is required to pay for the software application.

Query router 132 may additionally linguistically analyze the query to identify a user's emotional state or other information that may influence whether to respond to a query using iterative search, a chat session with a virtual agent, or a live support session with a human agent. Linguistic analysis may include the use of textual analysis (e.g., for queries received as text strings) or paralinguistic analysis (e.g., for queries received as audio data) to extract emotional state information from a query. For example, information derived from a query that indicates that a user is frustrated, angry, or surprised while asking the question (e.g., from the phrasing of the question, the tone of voice in which the user asked the question, and the like) may weigh in favor of initiating a live support session. In contrast, information indicating that a user has asked a question without a negative emotional response may weigh in favor of directing a user to an incremental search system or virtual agent to obtain an answer to the query.

Query router 132 additionally may parse the received query to determine the subject matter of the query. In some cases, the subject matter of the query may determine, at least in part, the support system to be invoked to process a query. For example, query router 132 may route queries related to one or more topics on a predetermined list of topics to a live support system 140 without further analysis of the query. These topics may include, for example, queries related to paying for the software application, retrieving or resetting user credentials, and other topics for which live interaction with a human support agent has been previously determined to be most effective in answering user queries.

In some cases, query router 132 can use information received from user device 120 to determine the context in which the user transmitted the query, and the context information can be used, at least in part, to determine the support system to be used to process the query. For example, the query may be accompanied by user identity information (e.g., a user name, an e-mail address associated with a user account, or some other unique identifier associated with a user), and query router 132 can search for information about the user in one or more data stores to determine the context of the query. In such an example, the user identity information may be used to determine a level of experience the user has with the software application, whether the user has purchased the software application in the past, a frequency at which the user has previously invoked support sessions, a frequency at which the user has previously invoked live support sessions with a human agent, and the like. In other cases, the information received from user device 120 may include information about an amount of time that the user has spent on a particular portion of the workflow and other information that can be used to predict the support system that can effectively provide an answer to the query, minimize the use of live support sessions with human agents, and minimize a likelihood that users will discontinue use of the software application.

Based on the information derived from a linguistic analysis of the received query (e.g., as discussed above, a textual analysis and/or paralinguistic analysis of the received query) and the context information associated with the query, query router 132 can use a predictive model to determine which support system to use to provide an answer to the received query. The predictive model may, in some cases, be dynamically updated based on historical information about previously completed support sessions to refine the process by which queries are routed to different support systems (e.g., virtual agent 134, incremental searcher 136, and/or live support system 140). Generally, the predictive model uses information about the type of question asked, the subject matter of the question asked, context information associated with the question, and historical information to determine whether to route a query to virtual agent 134, incremental searcher 136, or live support system 140 for processing. In some cases, the predictive model can weight some paralinguistic information related to a query more heavily in favor of initiating a live support system with a human agent via live support system 140 (e.g., where a user is frustrated, confused, or angry, which may indicate a high risk that the user will discontinue use of the software application if the user does not quickly receive an answer to the user's query). Other information, such as the subject matter of the question, may be weighted in favor of initiating an incremental search session or a support system through virtual agent 134. For example, the predictive model used by query router 132 to determine which support system to use to process a query may route a question about how to complete a particular portion of a workflow to an incremental search session against a portion of answer data store 150. In some cases, if the predictive model includes information about the complexity of a portion of a workflow or that historical support data has indicated that users have been most effectively served through an automated screen sharing session, the predictive model routes the query to virtual agent 134 for processing.

In some cases, query router 132 determines how to route the query for processing multiple times during a single support session (e.g., from when a user transmits a query from user device 120 to completion of the portion of the workflow that is the subject of the query) and may route different queries received during the support session to different support systems. For example, suppose that a user requests assistance in entering income information into a tax preparation workflow. Because there are multiple types of income that can be provided to a tax preparation workflow (e.g., wage income on Form W-2, interest income on Form 1099-INT, dividend income on Form 1099-DIV, partnership income on Form 1065 K-1, and so on), query router 132 initially directs the query to incremental searcher 136 for processing, which may provide links to instructions for entering income information into the tax preparation workflow for different types of income. As a user generates more specific queries (e.g., requesting instructions for entering information from specific tax forms), query router 132 processes the more specific queries to determine whether to continue using incremental searcher 136 to serve the user or to switch the user to a support session with virtual agent 134 or real-time human interaction through an agent using live support system 140. In this example, if the user requests information about entering income from simpler forms, such as dividend income on Form 1099-DIV, into the tax workflow, query router 132 determines that the user can continue to be served using incremental searcher 136. However, because entering partnership income on Form 1065 K-1 is a more complex process that involves multiple steps and a potentially large amount of data entry, the predictive model used by query router 132 to route queries to different support systems may initiate a support session with virtual agent 134. Virtual agent 134 may, for example, respond to the query by sharing a plurality of screens including information that illustrates how data is to be transferred from a paper Form 1065 K-1 to the tax preparation workflow.

If, however, the user generates additional subsequent queries regarding how to enter partnership income into the tax workflow or why previous entries have generated errors in the software application, query router 132 may use information about the number of additional queries, a length of time the user has been attempting to complete a portion of the income entry workflow, and the like to determine whether to initiate a support session with a human agent through live support system 140. For example, if a user has spent an extended period of time on a particular portion of the partnership income entry workflow and has asked similar questions multiple times, query router 132 may infer that the user is likely to be dissatisfied or frustrated with the software application (and thus likely to discontinue use of the software application) and that previous automated attempts at supporting the user has failed. Thus, query router 132 may initiate a support session with a human agent by routing a query to live support system 140. In some cases, after a human agent answers a query, query router 132 analyzes further queries to determine whether to continue to support the user via the support session with the human agent or whether an automated support system can be used to provide answers to the user (e.g., whether to transfer the user back to interaction with a virtual agent or a self-directed, iterative search of a knowledge base).

In another example, suppose that a user who is either a first-time user of the software application or a user of a free version of the software application is prompted to pay for the software application, and in response, the user transmits a query (e.g., as a text string or an audio file that query router 132 converts to a text string using speech-to-text conversion) to support system 130 asking why the user is required to pay for use of the software application. The paralinguistic processing performed by query router 132 may determine (1) that the question is an open-ended question that may not be satisfactorily answered using a rule-based model and (2) that the user is surprised or otherwise unhappy about being requested to pay for use of the software application. Further, query router 132 may examine the context information associated with the query to determine that the user is a new user or a user that has previously used a free version of the software application. The predictive model used by query router 132 may use the information derived from paralinguistic processing of the query and the context information to determine that the user is likely to discontinue use of the software application if the user does not quickly receive an explanation for why the user is required to pay for the software application. In such a case, the predictive model may determine that the query should be transmitted to live support system 140 for processing, where a live support agent can discuss (e.g., via text chat, phone call, or video chat) why the user was requested to pay for use of the software application.

Virtual agent 134 generally is implemented as a virtual chatbot that uses artificial intelligence and/or sets of rules to provide answers to user queries in a conversational manner (e.g., in a manner similar to that of a human support agent providing support to a user via live support system 140). Virtual agent 134 may be configured with multiple sets of rules for different portions of the workflow hosted by the software application for which support system 130 provides user support. For example, in a tax preparation workflow, virtual agent 134 may be configured with a number of sets of rules for responding to queries about entering income and withholding information from various tax forms, claiming entitlement to tax credits, determining entitlement to tax deductions (and whether a user should take a standard deduction or itemized deduction), and the like. In an accounting workflow, virtual agent 134 may be configured with a number of sets of rules for generating invoices, paying existing invoices, generating different types of reports, and the like.

Iterative searcher 136 generally provides an interface through which a user of application 122 can search one or more knowledge bases (e.g., a knowledge base maintained by the provider of application 122 and/or a community-generated knowledge base) for information related to using application 122. In some cases, iterative searcher 136 may also be configured with various sets of rules that direct a user to, for example, progressively more specific knowledge base articles or community knowledge base postings that may provide an answer to a user query. In some cases, iterative searcher 136 may additionally leverage historical data about the queries executed by other users subsequent to a first query to suggest, to the user of application 122, one or more follow-up queries that the user can execute against the one or more knowledge bases.

Support data logger 138 generally records data about user queries and user experiences to answers provided by support system 130 and/or live support system 140 for future use in determining which support system to use to provide answers to user queries. In some cases, support data logger 138 may track an amount of time elapsed during a support session, explicit user feedback (e.g., user feedback indicating that the user was satisfied or dissatisfied with the support session), and implicit user feedback (e.g., whether a user discontinued use of the software application, which may serve as a proxy data point indicating user dissatisfaction with the support session). Based on the logged data, support data logger 138 generates data indicating the effectiveness of each of the support systems in answering user queries for a specific topic. The effectiveness data may be used to refine how query router 132 determines the support system to invoke for processing user queries such that query router 132 invokes the support system (e.g., virtual agent 134, incremental searcher 136, and/or live support system 140) that most effectively provides answers to user queries (e.g., has historically resulted in the lowest amount of user dissatisfaction or highest amount of user satisfaction).

Live support system 140 generally is used by one or more human support agents to converse with users that have initiated a live support session through support system 130. Generally, live support system 140 may allow a human support agent to interact, in real time, with the user of user device 120 via one or more of text chat, audio, and video conferencing to provide support to the user.

Answer data store 150 generally includes one or more data repositories in which articles related to solutions to user queries may be stored. In some cases, virtual agent 134 and/or iterative searcher 136 may execute searches against the data stored in answer data store 150 to find articles that may be pertinent to the received query. Answer data store 150, in some cases, may return a set of articles ranked by probable relevance, and support system 130 may process the received set and transmit the information in the received set of articles for display in a support system interface of application 122.

Figure 2:
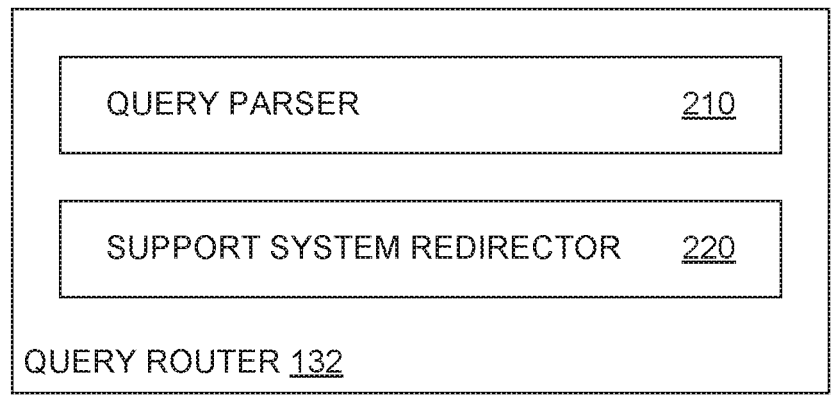
FIG. 2 illustrates an example query router, according to one embodiment.

FIG. 2 illustrates an example query router 132, according to an embodiment. As illustrated, query router 132 generally includes a query parser 210 and a support system redirector 220.

Query parser 210 generally receives a query (e.g., as a text string or an audio file that query router 132 converts to a text string using speech-to-text conversion) requesting support for a particular portion of a workflow from user device 120 and examines the received query to determine the type of the question, the topic of the support request, and the context in which the user generated the support request. As discussed above, to determine type of the question, the topic of the support request, and the context in which the user generated the support request, query parser 210 can perform a paralinguistic analysis of the received query to determine whether the question is open-ended or closed-ended, information about the data a user is searching for, and the emotional state of the user when the user generated the query. In some cases, query parser 210 may receive textual information (e.g., from a search request text box in application 122 for submitting queries to support system 130) and/or multimedia content data (e.g., a voice file) for use in analyzing the query.

After query parser 210 examines the received query, the information derived from the received query may be passed to support system redirector 220 for processing. As discussed above, support system redirector 220 generally uses the information about whether a question is an open-ended question or a closed-ended question, the topic of the question, and other contextual information derived from the query or otherwise associated with the query to determine which support system is to be used to process the query. As discussed above, the contextual information derived from the query or otherwise associated with the query may include, for example, user emotional state derived from a paralinguistic analysis of the query, an amount of experience the user has with the software application, an amount of time the user has spent on a particular portion of a workflow hosted by the software application, and the like. Support system redirector 220 may, in some cases, direct queries related to certain topics to a particular support system regardless of other information derived from the query or otherwise associated with the query (e.g., automatically redirect questions regarding payment for the software application, resetting user credentials, and the like to live support system 140). In some cases, support system redirector 220 may invoke an iterative searcher 134 for open-ended queries and invoke a virtual agent 136 to process closed-ended queries. In some cases, support system redirector 220 may invoke a virtual agent 136 for queries for which a response may involve a screen sharing session for a number of steps in the workflow of if the topic of the query may be illustrated through the use of iterative searcher 134 but the context associated with the query indicates a probable high amount of user dissatisfaction with the software application.

Figure 3:
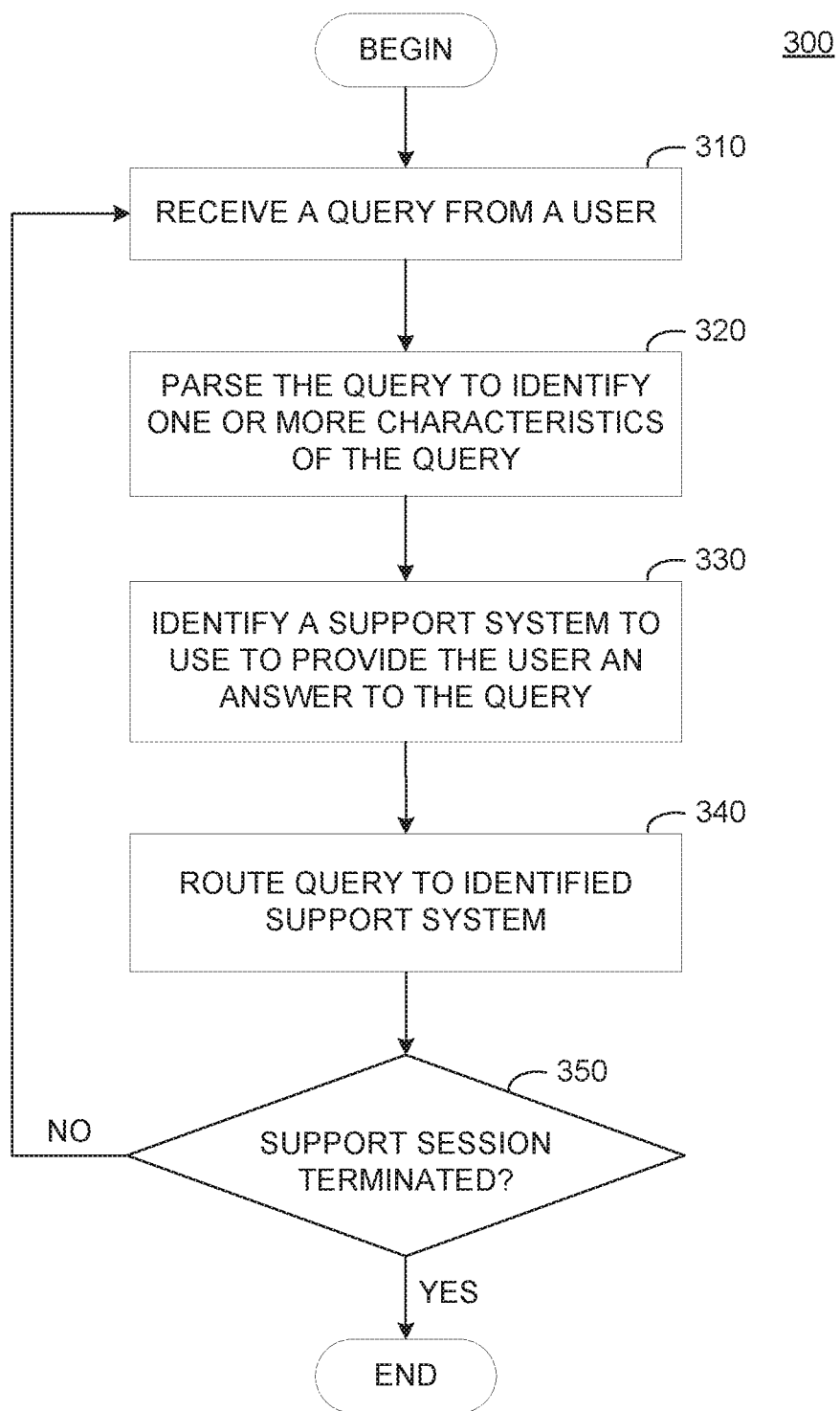
FIG. 3 illustrates example operations that may be performed by a query router to determine a support system to use for processing a query received from a user, according to one embodiment.

FIG. 3 illustrates example operations 300 that may be performed by a query router 132 for routing queries to different support systems for processing based on information included in and related to the query, according to an embodiment. As illustrated, operations 300 begin at step 310, where a query router 132 at a support system 130 receives a query from a user device 130. In some cases, the query may be received with context data indicating a state of the software application 122 at the time the query was generated. For example, the query may include a text string and contextual data about the user who is logged into the software application 122 at the time the query was generated, an amount of time the user has spent on a particular portion of the workflow, and the like.

At step 320, query router 132 parses the query to identify one or more characteristics of the query. As discussed above, query router 132 can parse the query to identify the subject of the query (e.g., the topic that the user is attempting to obtain information about), whether the query is an open-ended question or a closed-ended question, and the like. In some cases, the characteristics of the query may further include contextual information that can be determined from the query. For example, as discussed above, the query may include a user identifier, and query router 132 can use the user identifier to obtain additional information about the user (e.g., from a user information database) to provide context for the question, such as how long the user has used the software application, whether the user has paid for the software application in the past or has used a free version of the software application, historical data about previous support sessions invoked by the user, and the like.

At step 330, query router 132 identifies a support system to use to provide the user an answer to the query. Query router 132 can identify a support system to use to provide an answer to a user query based, at least in part, on the characteristics of the query identified by parsing the query. In some cases, query router 132 can further utilize contextual information received from user device 120 in conjunction with the received query to identify the support system to use to respond to the user query. For example, the contextual information received from user device 120 may include user identity information, timing information related to an amount of time a user has spent on a particular part of the workflow, and the like. Based on a model that takes into account a type of question posed by the query, the subject matter of the query, and contextual data associated with the query, query router 132 can predict which support system is likely to resolve the user's query in a manner that minimizes a risk of a user discontinuing use of the software application and the number of live support sessions with human agents that are instantiated to provide user support (which, as discussed above, may be an expensive process).

At step 340, query router 132 routes the query to the identified support system for processing. In some cases, upon termination of the support session, operations 300 may terminate. If, however, at step 350, query router 132 determines that the user has not terminated the support system, operations 300 may return to 310, where query router 132 waits for a subsequent query to be received from the user. By continually monitoring the queries submitted by a user to a support system and contextual information associated with those queries, query router 132 can dynamically, and in real-time, identify the most effective support system to use for providing support to a user.

Figure 4:
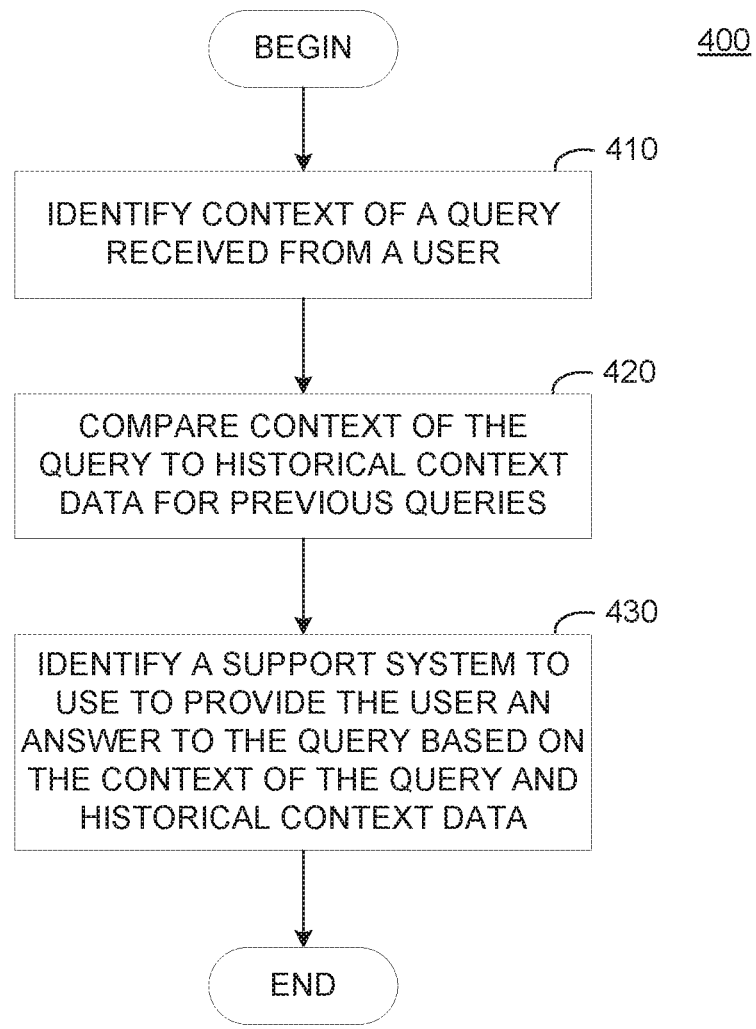
FIG. 4 illustrates example operations that may be performed by query router to determine the context associated with a query and route the query to a support system based on the content of the query and the context associated with the query, according to one embodiment.

FIG. 4 illustrates example operations 400 that may be performed by a query router 132 for identifying the support system to use to provide an answer to a user query, according to an embodiment. As illustrated, operations 400 begin at step 410, where query router 132 identifies a context of a query received from a user. In some cases, where user name information is included with the query, query router 132 can access a credentials database to obtain historical information about the user. As discussed above, this historical information may include, for example, an amount of time that the user has used the software application and/or other applications related to the software application (e.g., previous versions of the software application). In some cases, query router 132 may use user credential information to obtain additional context information for use in identifying the support system to use to respond to a query.

At step 420, query router 132 compares the context of the query to historical context data for previous queries. In some cases, context data and information about previous queries can be used, at least in part, to determine the support system that will be used to respond to a user query. Query router 132 can obtain the historical context data from an activity log or database that tracks the inputs used to instantiate support sessions using one or more of virtual agent 134, incremental searcher 136, and/or live support system 140.

At step 430, query router 132 identifies a support system to use to provide the user an answer to the query. The support system may be identified based on the context of the query and historical context data. As discussed above, when a user generates a subsequent query, the analysis of the subsequent query may follow substantially similar steps for query router 132 to analyze the query and transfer the query to one or more support systems to be processed, as discussed herein.

Figure 5:
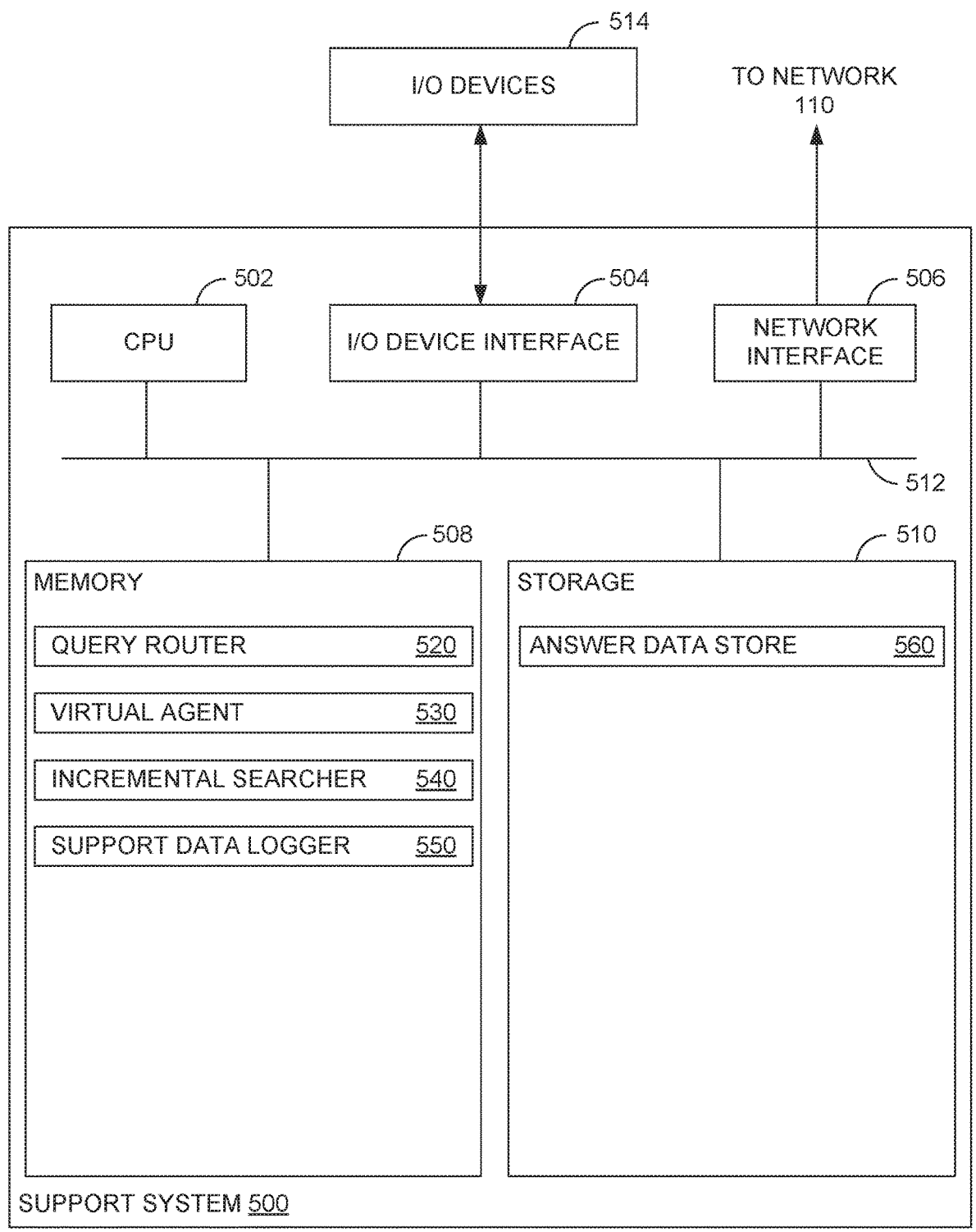
FIG. 5 illustrates an example system for integrating virtual agents and human agents in a multi-channel support system for complex software applications, according to one embodiment.

FIG. 5 illustrates a system 500 that analyzes a query and contextual information associated with the query to determine a support system to use to respond to a software application support request, according to an embodiment. As shown, the system 500 includes, without limitation, a central processing unit (CPU) 502, one or more I/O device interfaces 504 which may allow for the connection of various I/O devices 514 (e.g., keyboards, displays, mouse devices, pen input, etc.) to the system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a query router 520, virtual agent 530, incremental searcher 540, and support data logger 550. Query router 520 generally receives queries from other user devices (e.g., via network 110) requesting support for one or more aspects of a software application and additional contextual information related to the query. As discussed above, query router 520 can analyze the query to derive, for example, information about the type of question included in the query, the subject of the query, and the like. Query router 520 may input the information extracted from the query and, in some cases, context information associated with the query into a predictive model that identifies the support system to use to respond the query. The predictive model may identify the support system to use in processing a query such that the identified support system has a low likelihood of causing a user to abandon use of the software application while minimizing a number of times that a query is processed by a human agent working on live support system 140.

Virtual agent 530 may be an automated chatbot or other automated conversational system that uses user input and sets of rules to determine what a user wishes to converse about and provide answers to user queries automatically. Virtual agent 530 may, in some cases, be configured with a plurality of sets of rules and other logic associated with different portions of a workflow executed by a software application. These rules and logic may allow virtual agent 530 to receive step-by-step input from a user and return step-by-step output to the user in, for example, a chat window or other support session simulating a support system hosted by live support system 140.

Incremental searcher 540 generally provides an interface through which a user of application 122 can search one or more knowledge bases (e.g., a knowledge base maintained by a provider of application 122 and/or a community-generated knowledge base) for information related to using application 122. As discussed, incremental searcher 540 may receive a first query from a user and generate a first subset of results from the answer data store 560. A second, subsequent query may cause incremental searcher 540 to generate a second subset of results, which may include a filtered version of the first subset of results.

As shown, storage 510 includes an answer data store 560. Answer data store 560 generally includes one or more data repositories in which articles related to solutions to user queries may be stored. In some cases, virtual agent 530 and/or iterative searcher 540 can execute searches against the data stored in answer data store 560 to find articles that may be pertinent to the received query. In some cases, answer data store 560 may further include historical query response data that may be used to route queries to one or more of virtual agent 530, iterative searcher 540, and/or live support system 140 based on the success of previous routings in returning a usable answer to the user that minimizes the chances of a user discontinuing use of the software application.

Advantageously, by using information derived from the content of a query and, in some cases, context information associated with the query, a support system can route received queries to an automated support system or a live support system staffed by one or more human agents based on a prediction of which support system is likely to avoid the risk that a user will discontinue use of the software application. Further, the techniques discussed herein generally may favor the instantiation of support sessions using virtual agents, iterative searchers, or other automated support systems over live support systems using human agents, which may reduce the costs of providing support to users of a software application.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving a support request initiated by a user of a software application from a client device;
   parsing the support request to identify one or more characteristics of the support request;
   for each of a plurality of support systems, determining a predicted reduction in risk of the user discontinuing use of the software application based at least in part on the identified one or more characteristics of the support request and contextual information, wherein the contextual information comprises at least information about an amount of time that the user has spent working on a particular part of a workflow in the software application prior to generating the support request;
   identifying a support systems to process the support request, wherein the identified support system comprises a system from the plurality of support systems having a highest predicted reduction in risk of the user discontinuing use of the software application; and
   instantiating a support session with the identified support system to process the support request.

2. The method of claim 1, further comprising:
   receiving a subsequent support request from the client device in response to an answer to the support request provided to the client device by the identified support system;
   parsing the subsequent support request from the client device to identify one or more characteristics of the subsequent support request; and
   determining whether to instantiate a support session with a second support system to process the subsequent support request based at least in part on the identified one or more characteristics of the subsequent support request.

3. The method of claim 1, wherein parsing the support request to identify the one or more characteristics of the support request comprises linguistically analyzing the support request to determine one or more of a type of a question included in the support request and a topic of the question.

4. The method of claim 1, wherein the support request includes a user identifier, and wherein the contextual information is determined based, at least in part, on the user identifier.

5. The method of claim 4, further comprising:
   determining that the user associated with the user identifier is one of a first-time user of the software application or a user of a free version of the software application,
   wherein identifying the support system comprises selecting a live support system to process the support request based on determining that the user is one of a first-time user of the software application or a user of a free version of the software application.

6. The method of claim 1, wherein the contextual information further comprises emotional response information derived from the support request.

7. The method of claim 1, wherein the identified support system comprises one of an incremental search system, a virtual agent system, and a live support system.

8. The method of claim 1, wherein identifying the support system to process the support request comprises:
   determining whether the support request is an open-ended question or a closed-ended question; and
   identifying the support system based on determining whether the support request is an open-ended question or a closed-ended question.

9. The method of claim 1, further comprising:
   logging feedback about the support session;
   generating data indicating effectiveness of each of a plurality of support systems in resolving a topic included in the support request; and
   refining rules used to identify the support system to process the support request based on the generated data.

10. The method of claim 9, wherein the rules identify the support system as a system associated with a highest level of user satisfaction for answering support requests related to the topic.

11. A system, comprising:
    a processor; and
    a memory having instructions stored thereon which, when executed by the processor, performs an operation for selecting a support system to process a support request, the operation comprising:
      receiving the support request initiated by a user of a software application from a client device;
      parsing the support request to identify one or more characteristics of the support request;
      for each of a plurality of support systems, determining a predicted reduction in risk of the user discontinuing use of the software application based at least in part on the identified one or more characteristics of the support request and contextual information, wherein the contextual information comprises at least information about an amount of time that the user has spent working on a particular part of a workflow in the software application prior to generating the support request;

identifying a support system from the plurality of support systems to process the support request, wherein the identified support system comprises a system from the plurality of support systems having a highest predicted reduction in risk of the user discontinuing use of the software application; and instantiating a support session with the identified support system to process the support request.

12. The system of claim 11, wherein the operation further comprises:

receiving a subsequent support request from the client device in response to an answer to the support request provided to the client device by the identified support system;

parsing the subsequent support request from the client device to identify one or more characteristics of the subsequent support request; and determining whether to instantiate a support session with a second support system to process the subsequent support request based at least in part on the identified one or more characteristics of the subsequent support request.

13. The system of claim 11, wherein parsing the support request to identify the one or more characteristics of the support request comprises linguistically analyzing the support request to determine one or more of a type of a question included in the support request and a topic of the question.

14. The system of claim 11, wherein the support request includes a user identifier, and wherein the contextual information is determined based, at least in part, on the user identifier.

15. The system of claim 11, wherein the contextual information further comprises emotional response information derived from the support request.

16. A non-transitory computer-readable medium comprising instructions which, when executed on a processor, performs an operation for selecting a support system to process a support request, the operation comprising:

receiving a support request initiated by a user of a software application from a client device;

parsing the support request to identify one or more characteristics of the support request;

for each of a plurality of support systems, determining a predicted reduction in risk of a user initiating the support request discontinuing use of a software application based at least in part on the identified one or more characteristics of the support request and contextual information, wherein the contextual information comprises at least information about an amount of time that the user has spent working on a particular part of a workflow in a software application prior to generating the support request;

identifying a support system from the plurality of support systems to process the support request, wherein the identified support system comprises a system from the plurality of support systems having a highest predicted reduction in risk of the user discontinuing use of the software application; and instantiating a support session with the identified support system to process the support request.

17. The non-transitory computer-readable medium of claim 16, wherein the operation further comprises:

receiving a subsequent support request from the client device in response to an answer to the support request provided to the client device by the identified support system;

parsing the subsequent support request from the client device to identify one or more characteristics of the subsequent support request; and determining whether to instantiate a support session with a second support system to process the subsequent support request based at least in part on the identified one or more characteristics of the subsequent support request.

18. The non-transitory computer-readable medium of claim 16, wherein parsing the support request to identify the one or more characteristics of the support request comprises linguistically analyzing the support request to determine one or more of a type of a question included in the support request and a topic of the question.

19. The non-transitory computer-readable of claim 16, wherein the support request includes a user identifier, and wherein the contextual information is determined based, at least in part, on the user identifier.

20. The computer-readable medium of claim 16, wherein the contextual information further comprises emotional response information derived from the support request.

* * * * *